(12) United States Patent
Kitaoka et al.

(10) Patent No.: US 12,438,306 B2
(45) Date of Patent: Oct. 7, 2025

(54) CONNECTOR DEVICE WITH LOCKING MECHANISM

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Kenichi Kitaoka, Yokkaichi (JP); Junichi Mukuno, Yokkaichi (JP); Hiroaki Saito, Osaka (JP); Tatsuya Ankyu, Osaka (JP); Takayoshi Bando, Osaka (JP); Tomohiro Yoshino, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 391 days.

(21) Appl. No.: 17/925,768

(22) PCT Filed: May 18, 2021

(86) PCT No.: PCT/JP2021/018790
§ 371 (c)(1),
(2) Date: Nov. 16, 2022

(87) PCT Pub. No.: WO2021/241329
PCT Pub. Date: Dec. 2, 2021

(65) Prior Publication Data
US 2023/0198205 A1    Jun. 22, 2023

(30) Foreign Application Priority Data
May 27, 2020 (JP) .................. 2020-092508

(51) Int. Cl.
*H01R 13/639* (2006.01)
*H01R 13/516* (2006.01)
*H01R 13/629* (2006.01)

(52) U.S. Cl.
CPC ......... *H01R 13/639* (2013.01); *H01R 13/516* (2013.01); *H01R 13/629* (2013.01)

(58) Field of Classification Search
CPC ... H01R 13/629; H01R 13/516; H01R 13/639
See application file for complete search history.

(56) References Cited

U.S. PATENT DOCUMENTS

| 8,172,599 B2* | 5/2012 | Konchan | B60L 53/16 320/108 |
| 8,547,059 B2* | 10/2013 | Kurumizawa | H01R 13/6397 320/111 |

(Continued)

FOREIGN PATENT DOCUMENTS

| JP | 2013-073878 A | 4/2013 |
| JP | 2014-146442 A | 8/2014 |
| JP | 2020-129465 A | 8/2020 |

OTHER PUBLICATIONS

Aug. 3, 2021, Search Report issued in International Patent Application No. PCT/JP2021/018790.

*Primary Examiner* — Harshad C Patel
(74) *Attorney, Agent, or Firm* — Oliff PLC

(57) ABSTRACT

The connector device is configured so that a first connector part and a second connector part are detachable. The connector device has a first lock part constituting a lock part that engages in the attachment/detachment direction between the first connector part and the second connector part.

1 Claim, 12 Drawing Sheets

(56) References Cited

U.S. PATENT DOCUMENTS

| | | | | |
|---|---|---|---|---|
| 8,550,833 | B2* | 10/2013 | Martin | H01R 13/6397 |
| | | | | 439/372 |
| 8,974,238 | B2* | 3/2015 | Chou | H05K 5/0278 |
| | | | | 439/131 |
| 9,070,994 | B2* | 6/2015 | Tajima | H01R 13/428 |
| 9,083,104 | B2* | 7/2015 | Kim | H01R 13/4534 |
| 9,368,907 | B2* | 6/2016 | Becker | H01R 13/504 |
| 9,533,586 | B2* | 1/2017 | Kahara | B60L 53/16 |
| 9,812,820 | B2* | 11/2017 | Takagi | B60L 53/16 |
| 11,325,487 | B2* | 5/2022 | Djedovic | B60L 53/16 |
| 11,536,049 | B2* | 12/2022 | Zhou | E05B 47/0012 |
| 11,639,616 | B2* | 5/2023 | Dahmer | E05B 83/28 |
| | | | | 292/1 |
| 11,682,857 | B2* | 6/2023 | Scanzillo | H01R 13/6278 |
| | | | | 439/39 |
| 11,745,607 | B2* | 9/2023 | Führer | H01R 13/701 |
| | | | | 439/352 |
| 2012/0108097 | A1* | 5/2012 | Takagi | H01R 13/6275 |
| | | | | 439/345 |
| 2012/0149226 | A1 | 6/2012 | Ishibashi | |
| 2013/0137286 | A1* | 5/2013 | Smith | B60L 53/16 |
| | | | | 439/304 |
| 2021/0008990 | A1 | 1/2021 | Djedovic et al. | |
| 2021/0010572 | A1* | 1/2021 | Djedovic | H02K 5/08 |
| 2021/0075160 | A1* | 3/2021 | Töpfer | H01R 13/639 |

* cited by examiner

CONNECTOR DEVICE WITH LOCKING MECHANISM

BACKGROUND

Field of the Disclosure

The present disclosure relates to a connector device.

Related Art

A typical connector device electrically connects two devices for supplying power or performing charging (for example, refer to Japanese Laid-Open Patent Publication No. 2012-128966).

Such a connector device includes a first connector portion that is electrically connected to one device and a second connector portion that is electrically connected to the other device. The connector device is configured to connect the devices by electrically connecting an electrode arranged in the first connector portion to an electrode arranged in the second connector portion.

SUMMARY

Such a connector device may have a structure that allows for attachment and detachment of the first connector portion to and from the second connector portion. However, when the first connector portion is simply electrically connected to the second connector portion, the first connector portion may separate from the second connector portion.

An objective of the present disclosure is to provide a connector device that restricts separation of the two connector portions.

A connector device in accordance with the present disclosure allows attachment and detachment of a first connector portion to and from a second connector portion. The connector device includes a lock that has the first connector portion and the second connector portion engaged together in an attachment-detachment direction.

Advantageous Effects of Invention

The connector device according to the present disclosure restricts separation of the two connector portions.

DETAILED DESCRIPTION

Description of Embodiment of Present Disclosure

Figure 1:
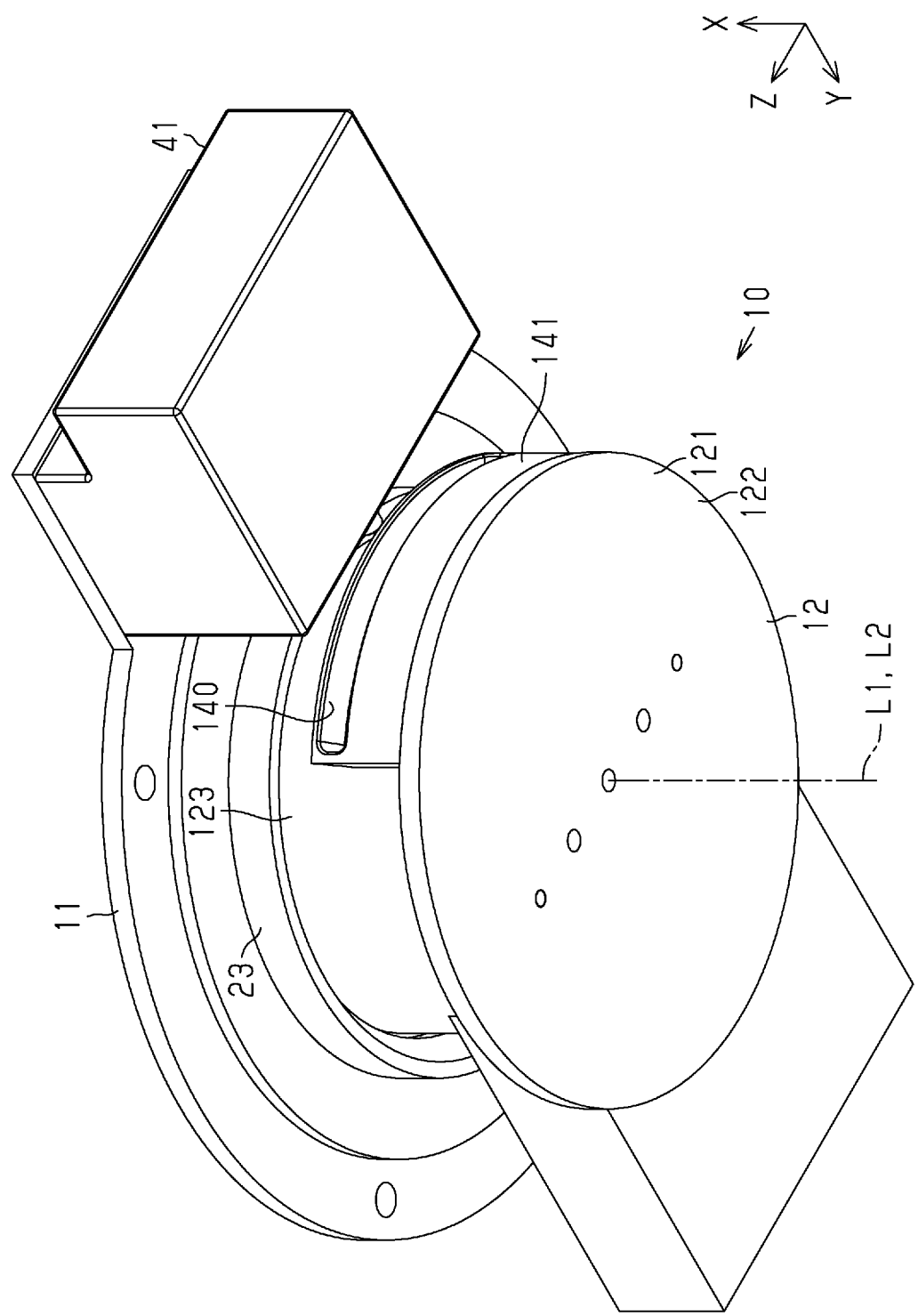
FIG. 1 is a perspective view of a connector device in accordance with an embodiment.

An embodiment of the present disclosure will now be described.

(1) A connector device in accordance with the present disclosure allows attachment and detachment of a first connector portion to and from a second connector portion. The connector device includes a lock that has the first connector portion and the second connector portion engaged together in an attachment-detachment direction.

With this structure, the lock has the first connector portion and the second connector portion engaged together in the attachment-detachment direction. This restricts separation of the first connector portion and the second connector portion.

(2) Preferably, the lock includes a first lock portion and a second lock portion. The first lock portion includes an actuator and a pin engagement groove. The actuator is arranged on one of the first connector portion and the second connector portion and configured to move a pin back and forth. The pin engagement groove is arranged in the other one of the first connector portion and the second connector portion to receive and engage the pin in the attachment-detachment direction. The second lock portion holds the pin engagement groove and the pin of the first lock portion in the engaged state.

With this structure, the first lock portion restricts relative movement of the first connector portion and the second connector portion in the attachment-detachment direction, and the engagement state resulting from the first lock portion is held by the second lock portion. This restricts separation of the first connector portion and the second connector portion. Further, when separating the two connector portions, the pin of the first lock portion is moved to disengage the pin from the pin engagement groove. This allows for easy separation of the connector portions.

(3) Preferably, the second lock portion includes a recess and a projection. The recess is arranged in one of the first connector portion and the second connector portion and recessed in a direction intersecting an engagement direction of the pin engagement groove and the pin. The projection arranged on the other one of the first connector portion and the second connector portion and fitted to the recess.

With this structure, the second lock portion has a simple structure including the recess, recessed in a direction intersecting the engagement direction of the pin engagement groove and the pin, and the projection fitted to the recess.

(4) Preferably, the recess and the projection extend in the attachment-detachment direction of the first connector portion and the second connector portion and are ring-shaped in a circumferential direction extending about an imaginary axis that lies on an attachment-detachment center.

With this structure, the recess and the projection are ring-shaped. This stably holds the first lock portion in the engaged state.

DETAILED DESCRIPTION OF EMBODIMENT OF PRESENT DISCLOSURE

A specific example of the connector device in accordance with the present disclosure will now be described with reference to the drawings. To facilitate understanding, configurations may be partially exaggerated or simplified in the drawings. Further, elements may not be drawn to scale. In the present specification, "parallel" and "orthogonal" include not only strictly parallel and strictly orthogonal cases but also include generally parallel and generally orthogonal cases within a range allowing the advantages of the present embodiment to be obtained. The present invention is not limited to the illustrated embodiments and intended to be defined by the claims and their equivalents, and all variations within the scope of the claims and their equivalents.

As shown in FIG. 1, a connector device 10 includes a first connector portion 11 and a second connector portion 12. The connector device 10 electrically connects, for example, a battery mounted on a vehicle and a charging device. The connector device 10 is configured to allow attachment and detachment of the first connector portion 11 to and from the second connector portion 12.

Structure of First Connector Portion 11

Figure 2:
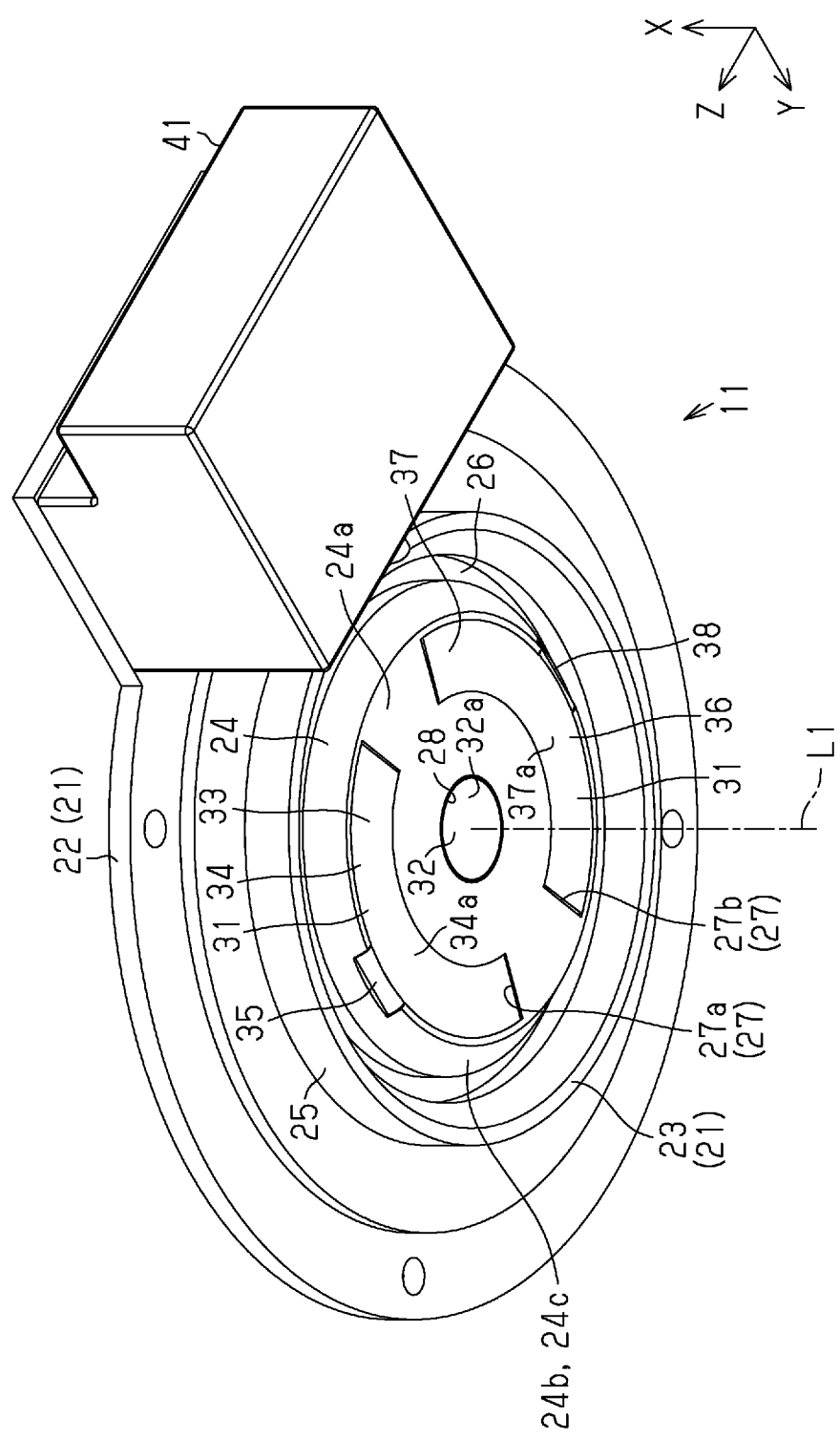
FIG. 2 is a perspective view of a first connector portion of the connector device in accordance with the embodiment.

FIG. 2 shows an example of the first connector portion 11 that is mounted on a vehicle and electrically connectable to a battery.

The first connector portion 11 may be disposed on, for example, a bottom surface of a vehicle. In this case, the first connector portion 11 is mounted on the bottom surface of the vehicle such that the first connector portion 11 is attached to and detached from the second connector portion 12 in a direction that is parallel to the vertical direction (gravitational direction). In the description hereafter, the attachment-detachment direction and the vertical direction will be referred to as the up-down direction. Among the XYZ axes shown in each drawing, the X-axis represents the up-down direction of the first connector portion 11, the Y-axis represents the front-rear direction (lengthwise direction) of the first connector portion 11 that is orthogonal to the X-axis, and the Z-axis represents the left-right direction (widthwise direction) of the first connector portion 11 that is orthogonal to the XY-plane. In the description hereafter, to facilitate understanding, the direction extending along the X-axis will be referred to as the up-down direction X, the direction extending along the Y-axis will be referred to as the front-rear direction Y, and the direction extending along the Z-axis will be referred to as the left-right direction Z. Further, in the following description, the X-arrow direction shown in FIG. 2 corresponds to the upward direction, and the Y-arrow direction shown in FIG. 2 corresponds to the forward direction.

As shown in FIG. 2, the first connector portion 11 includes a housing 21, a first electrode 31, a second electrode 32, and an actuator 41. The first electrode 31 is arranged on the housing 21. The second electrode 32 is arranged on the housing 21 in the same manner as the first electrode 31. The actuator 41 is arranged on the housing 21. The first electrode 31 and the second electrode 32 are arranged next to each other in the left-right direction Z.

Figure 4:
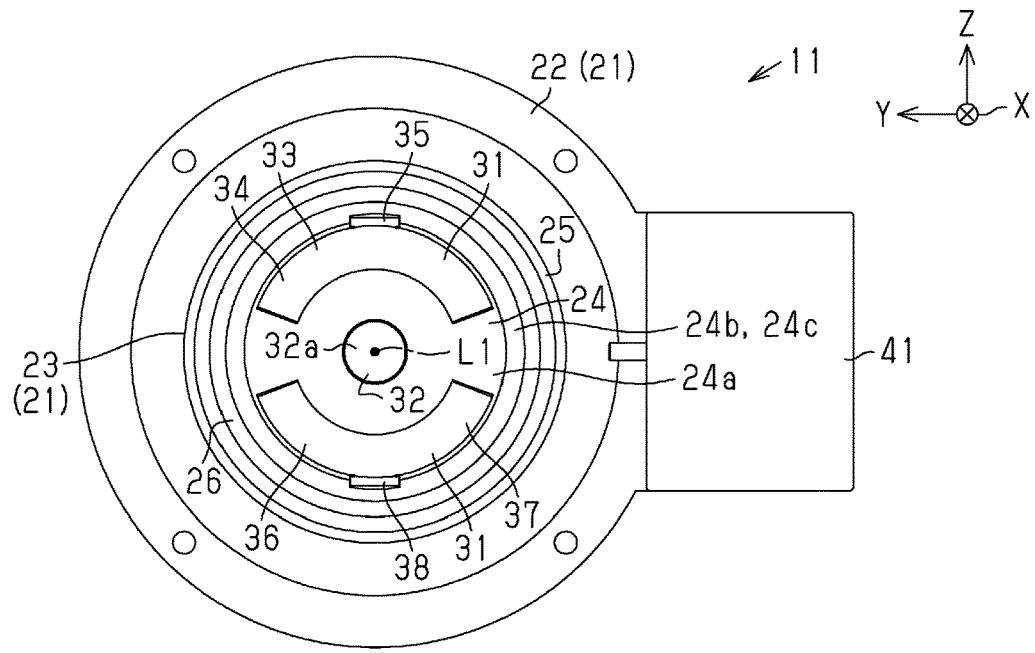
FIG. 4 is a plan view of the first connector portion of the connector device in accordance with the embodiment.

As shown in FIGS. 2 and 4, the housing 21 includes a base plate 22 and a holding portion 23. The holding portion 23 is attached to the base plate 22 to hold the first electrode 31 and the second electrode 32.

The base plate 22 is substantially disc-shaped. The base plate 22 includes through holes extending in the up-down direction X. For example, bolts are inserted through the through hole for fastening to the vehicle.

The holding portion 23 is formed by, for example, an insulative member of resin or the like. The holding portion 23 includes a holding portion main body 24, a guide 25, and an annular groove 26. The holding portion main body 24 is substantially disc-shaped. The guide 25 is arranged at an outer circumferential side of the holding portion main body 24 to guide the second connector portion 12. The annular groove 26 is formed between the holding portion main body 24 and the guide 25 to receive part of the second connector portion 12. The holding portion main body 24, the guide 25, and the annular groove 26 are integrated with one another.

As shown in FIG. 2, the holding portion main body 24 defines a substantially circular end surface 24a that includes a first seat 27 and a second seat 28 at one side of the holding portion main body 24 in the up-down direction X. The first seat 27 receives part of the first electrode 31. The second seat 28 receives the second electrode 32. In a state in which the first connector portion 11 is attached to the second connector portion 12, the end surface 24a of the holding portion main body 24 faces the second connector portion 12 in the up-down direction X. In the following description, the circumferential direction (rotational direction) and the radial direction are based on a first center axis L1 that extends through the center of the end surface 24a of the holding portion main body 24 in the up-down direction X. Specifically, a direction described as "the circumferential direction" refers to a circumferential direction with respect to the first center axis L1, and a direction described as "the radial direction" refers to a radial direction with respect to the first center axis L1.

The first seat 27 and the second seat 28 are recessed in the up-down direction X. The end surface 24a includes two first seats 27 in a radially outer portion of the end surface 24a. In the following description, one of the two first seats 27 may be referred to as the first seat 27a, and the other one of the two first seats 27 may be referred to as the first seat 27b.

The two first seats 27 are located 180 degrees opposite to each other in the circumferential direction. As viewed in the up-down direction X, each first seat 27 has the shape of an annular sector. Here, "annular sector" refers to a shape obtained by cutting out a sector from a ring at a predetermined center angle. In the following description, the term "annular sector" will have the same meaning. The first seats 27 are separated from each other in the circumferential direction.

The second seat 28 is formed in a substantially central position of the end surface 24a and recessed from the end surface 24a in the up-down direction X. As viewed in the up-down direction X, the second seat 28 has a substantially circular shape. In the present embodiment, the two first seats 27 are located at opposite sides of the second seat 28 and separated from each other by 180 degrees in the circumferential direction.

The holding portion main body 24 includes a chamfer 24c formed on a corner 24b of the end surface 24a. The chamfer 24c is formed so as to be gradually increased in diameter from the side of the end surface 24a, which is the distal end, toward the basal end side in the up-down direction X of the holding portion main body 24. The chamfer 24c may be formed by chamfering a sharp corner in post-processing or be formed in advance when molded from resin.

The holding portion main body 24 includes two through holes 24d and 24e extending in the up-down direction X. Among the two through holes 24d and 24e, the through hole 24d is formed in the radially outer side of the first seat 27a at a position that substantially coincides with the circumferential center of the first seat 27a. Among the two through holes 24d and 24e, the through hole 24e is formed in the radially outer side of the first seat 27b at a position that substantially coincides with the circumferential center of the first seat 27b.

Figure 7:
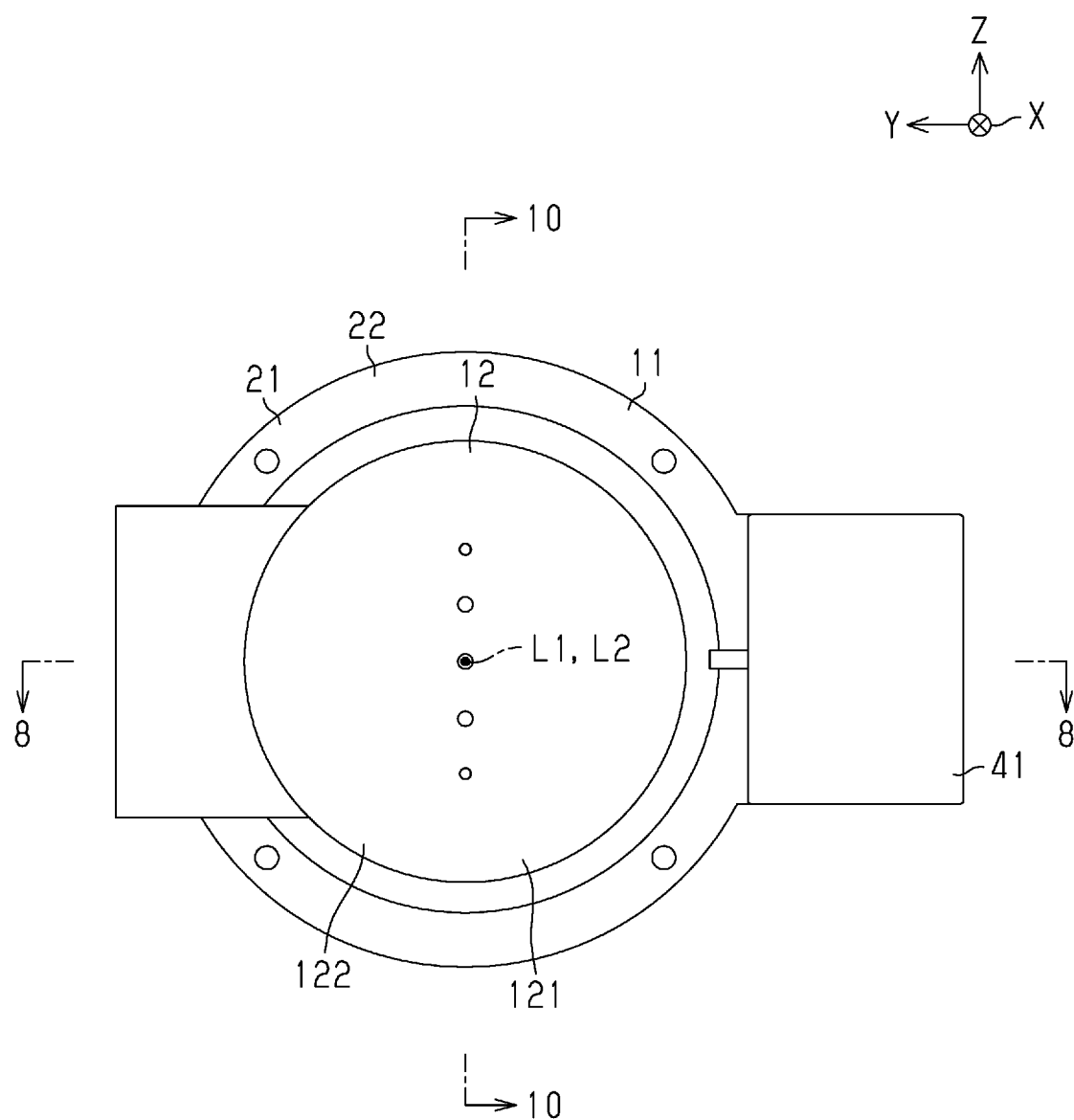
FIG. 7 is a plan view of the connector device in accordance with the embodiment.
Figure 8:
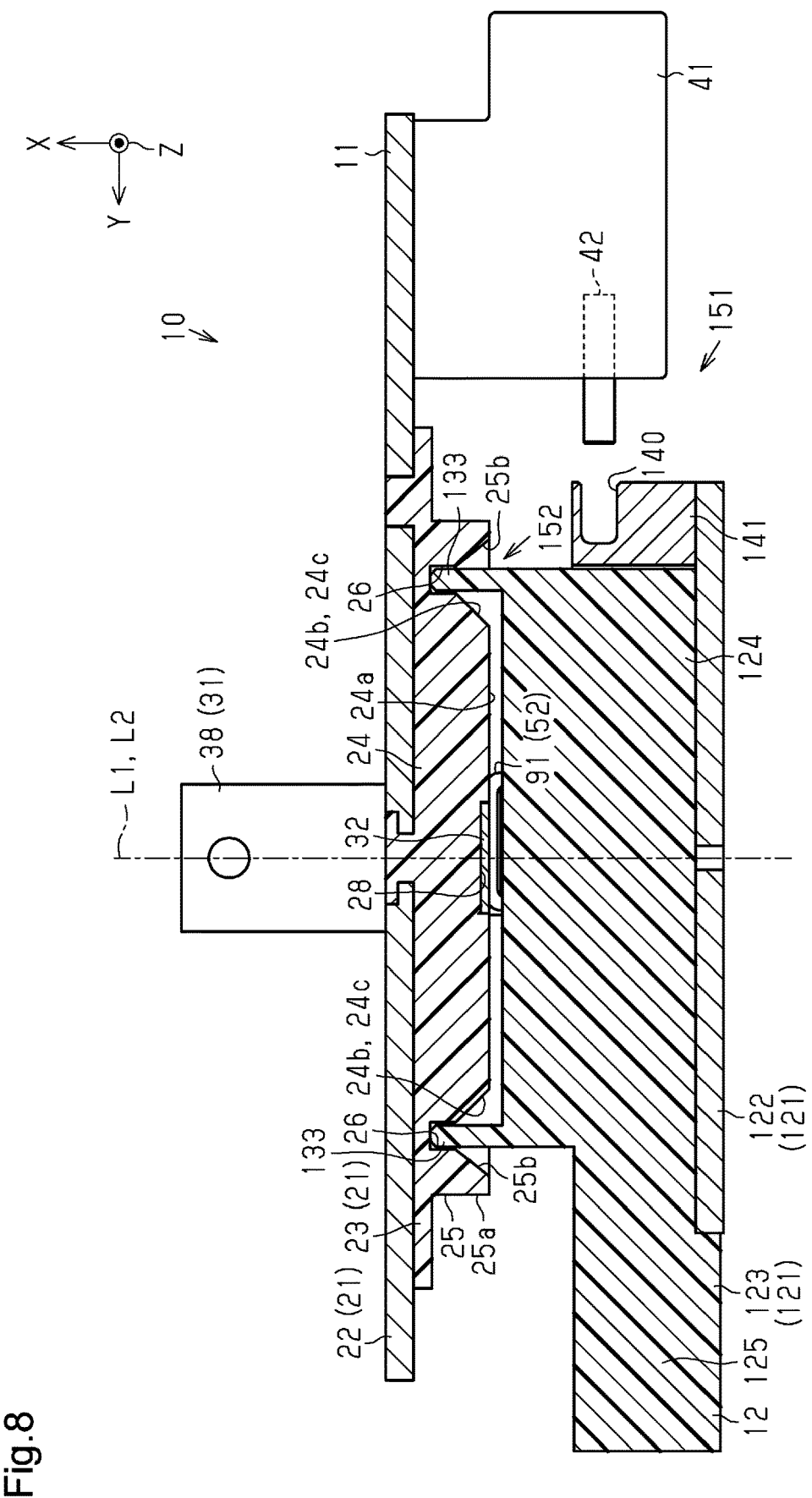
FIG. 8 is a cross-sectional view taken along line 8-8 in FIG. 7.

As shown in FIGS. 7 and 8, the guide 25 has a substantially cylindrical shape. More specifically, the guide 25 includes a radially outer side surface 25a and a radially inner side surface 25b. As viewed in the up-down direction X, the radially outer side surface 25a is circular. The radially inner side surface 25b is inclined with respect to the up-down direction X. The radially inner side surface 25b is inclined such that its diameter increases toward the second connector portion 12 located at the side opposite to the first connector portion 11 in the up-down direction X. In other words, the radially inner side surface 25b is inclined such that its diameter gradually decreases toward the side opposite to the second connector portion 12 in the up-down direction X. Thus, when connecting the first connector portion 11 and the second connector portion 12, the second connector portion 12 comes into contact with the radially inner side surface 25b of the guide 25 and is guided by the guide 25 to the annular groove 26.

As shown in FIG. 2, the annular groove 26 is recessed relative to the guide 25 and the holding portion main body 24 in the up-down direction X. The annular groove 26 is, for example, ring-shaped as viewed in the up-down direction X.

As shown in FIG. 4, the first electrode 31 includes a positive electrode high-voltage terminal 33 and a negative electrode high-voltage terminal 36.

The positive electrode high-voltage terminal 33 includes a first plate-like portion 34 and a second plate-like portion 35. In a state in which the first connector portion 11 is attached to the second connector portion 12, the first plate-like portion 34 faces the second connector portion 12. The second plate-like portion 35 projects toward the side opposite to the second connector portion 12.

As shown in FIG. 4, the first plate-like portion 34 has an annular sector shape as viewed in the up-down direction X. As viewed in the up-down direction X, the first plate-like portion 34 is substantially similar to the first seat 27a in shape and slightly smaller than the first seat 27a such that the first plate-like portion 34 can be fitted to the first seat 27a in the housing 21. In a state fitted in the first seat 27a, the first plate-like portion 34 includes a flat surface 34a exposed in the up-down direction. In a state in which the first connector portion 11 is attached to the second connector portion 12, the flat surface 34a faces the second connector portion 12 in the up-down direction X.

As shown in FIG. 4, in a state in which the first electrode 31 is held by the holding portion 23, the second plate-like portion 35 is located radially outward from the first plate-like portion 34. The second plate-like portion 35 is formed in a substantially circumferential central part of the first plate-like portion 34. In a state in which the first plate-like portion 34 is fitted in the first seat 27a, the second plate-like portion 35 extends through the through hole 24d of the holding portion main body 24 toward the side opposite the direction in which the first plate-like portion 34 is exposed. That is, the positive electrode high-voltage terminal 33 of the present embodiment is configured so that the first plate-like portion 34 is exposed toward one side with respect to the up-down direction X, and the second plate-like portion 35 is located at the other side with respect to the up-down direction X.

In the same manner as the positive electrode high-voltage terminal 33, the negative electrode high-voltage terminal 36 includes a first plate-like portion 37 and a second plate-like portion 38. In a state in which the first connector portion 11 is attached to the second connector portion 12, the first plate-like portion 37 faces the second connector portion 12. The second plate-like portion 38 projects toward the side opposite to the second connector portion 12. In the present embodiment, the negative electrode high-voltage terminal 36 has the same shape as the positive electrode high-voltage terminal 33.

As shown in FIG. 4, in the same manner as the first plate-like portion 34 of the positive electrode high-voltage terminal 33, the first plate-like portion 37 has an annular sector shape as viewed in the up-down direction X. That is, the first plate-like portion 34 has a radial length that is uniform in the circumferential direction. As viewed in the up-down direction X, the first plate-like portion 34 is substantially similar to the first seat 27b in shape and slightly smaller than the first seat 27b such that the first plate-like portion 34 can be fitted to the first seat 27b in the housing 21. In a state fitted in the first seat 27b, the first plate-like portion 37 includes a flat surface 37a exposed in the up-down direction. In a state in which the first connector portion 11 is attached to the second connector portion 12, the flat surface 37a faces the second connector portion 12 in the up-down direction X. Therefore, the flat surface 37a of the negative electrode high-voltage terminal 36 and the flat surface 34a of the positive electrode high-voltage terminal 33 are exposed in the same direction with respect to the up-down direction X.

As shown in FIG. 4, in a state in which the first electrode 31 is held by the holding portion 23, the second plate-like portion 38 is located radially outward from the first plate-like portion 37. The second plate-like portion 38 is formed in a substantially circumferential central part of the first plate-like portion 37. In a state in which the first plate-like portion 37 is fitted in the first seat 27b, the second plate-like portion 38 extends through the through hole 24e of the holding portion main body 24 toward the side opposite the direction in which the first plate-like portion 37 is exposed. That is, in the same manner as the positive electrode high-voltage terminal 33, the negative electrode high-voltage terminal 36 of the present embodiment is configured so that the first plate-like portion 37 is exposed toward one side with respect to the up-down direction X, and the second plate-like portion 38 is located at the other side with respect to the up-down direction X.

The second electrode 32 is arranged between the positive electrode high-voltage terminal 33 and the negative electrode high-voltage terminal 36 of the first electrode 31 in the left-right direction Z. More specifically, the second electrode 32 is arranged in a central position between the positive electrode high-voltage terminal 33 and the negative electrode high-voltage terminal 36 in the left-right direction Z. The second electrode 32 includes a substantially circular flat surface 32a that lies on the same plane as the flat surfaces 34a and 37a. The flat surface 32a faces the same direction as the flat surfaces 34a and 37a.

The second electrode 32 is formed to have a substantially circular shape as viewed in the up-down direction X. As viewed in the up-down direction X, the second electrode 32 is slightly smaller than the second seat 28 so that it can be fitted to the second seat 28 of the housing 21. In a state fitted in the second seat 28, the second electrode 32 is exposed in the up-down direction X. The second electrode 32 and the second seat 28 do not have to be substantially circular as viewed in the up-down direction X, and may have any other shape such as a polygon.

Figure 9:
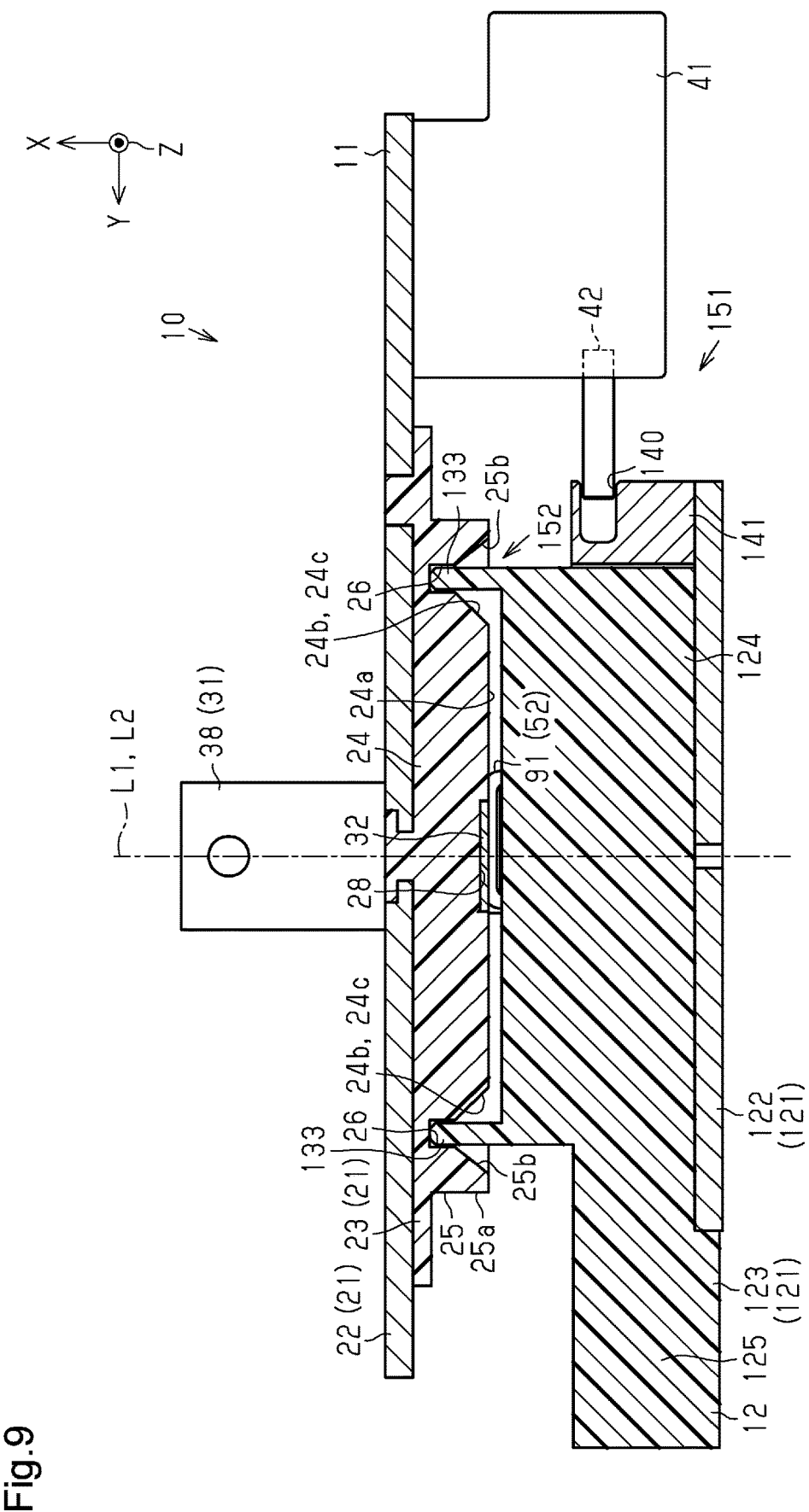
FIG. 9 is a cross-sectional view illustrating actuation of an actuator of the connector device in accordance with the embodiment.

As shown in FIGS. 8 and 9, the actuator 41 used in the present embodiment linearly moves, for example, a pin 42 back and forth. For example, the actuator 41 is an electric actuator that uses a motor or the like. The actuator 41 is fixed to the base plate 22 of the housing 21. In a state fixed to the base plate 22, the actuator 41 is arranged next to the holding portion 23 of the housing 21 in the front-rear direction Y. The actuator 41 may use a known device, as long as the pin 42 can be linearly moved back and forth, as described above.

Structure of Second Connector Portion

Figure 3:
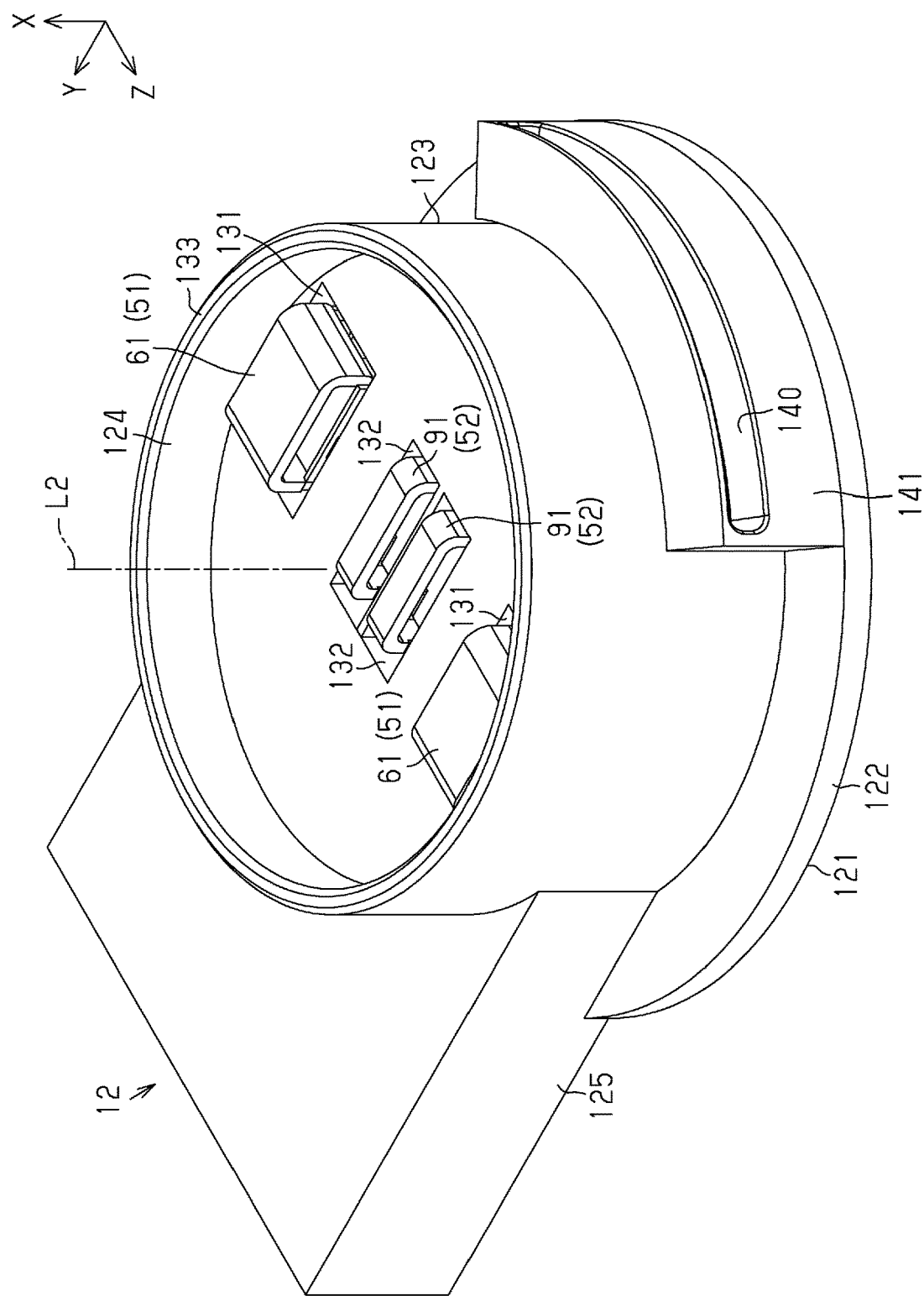
FIG. 3 is a perspective view of a second connector portion of the connector device in accordance with the embodiment.
Figure 5:
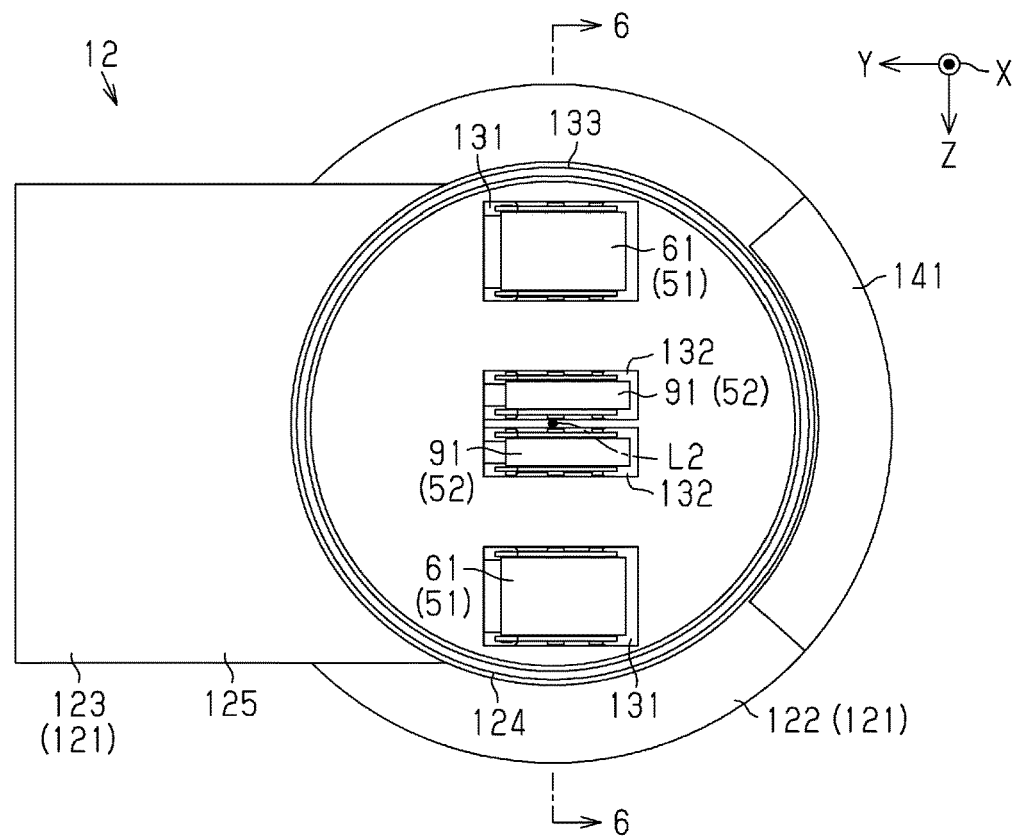
FIG. 5 is a plan view of the second connector portion of the connector device in accordance with the embodiment.

As shown in FIGS. 3 and 5, the second connector portion 12 includes a first electrode 51, a second electrode 52, and a housing 121. The housing 121 holds the first electrode 51 and the second electrode 52. The first electrode 51 is electrically connectable to the first electrode 31 of the first connector portion 11. The second electrode 52 is electrically connectable to the second electrode 32 of the first connector portion 11. In the description hereafter, the circumferential direction (rotational direction) and the radial direction are based on a second center axis L2 that extends through the center of a cylindrical projection 133, which will be described later, in the up-down direction X. The cylindrical projection 133 is part of the housing 121 and configured to be fitted to the annular groove 26 of the first connector portion 11. Specifically, a direction described as "the circumferential direction" refers to a circumferential direction with respect to the second center axis L2, and a direction described as "the radial direction" refers to a radial direction with respect to the second center axis L2. In the present example, when the first connector portion 11 is attached to the second connector portion 12, the first center axis L1 coincides with the second center axis L2.

The first electrode 51 includes two first terminal modules 61.

Figure 10:
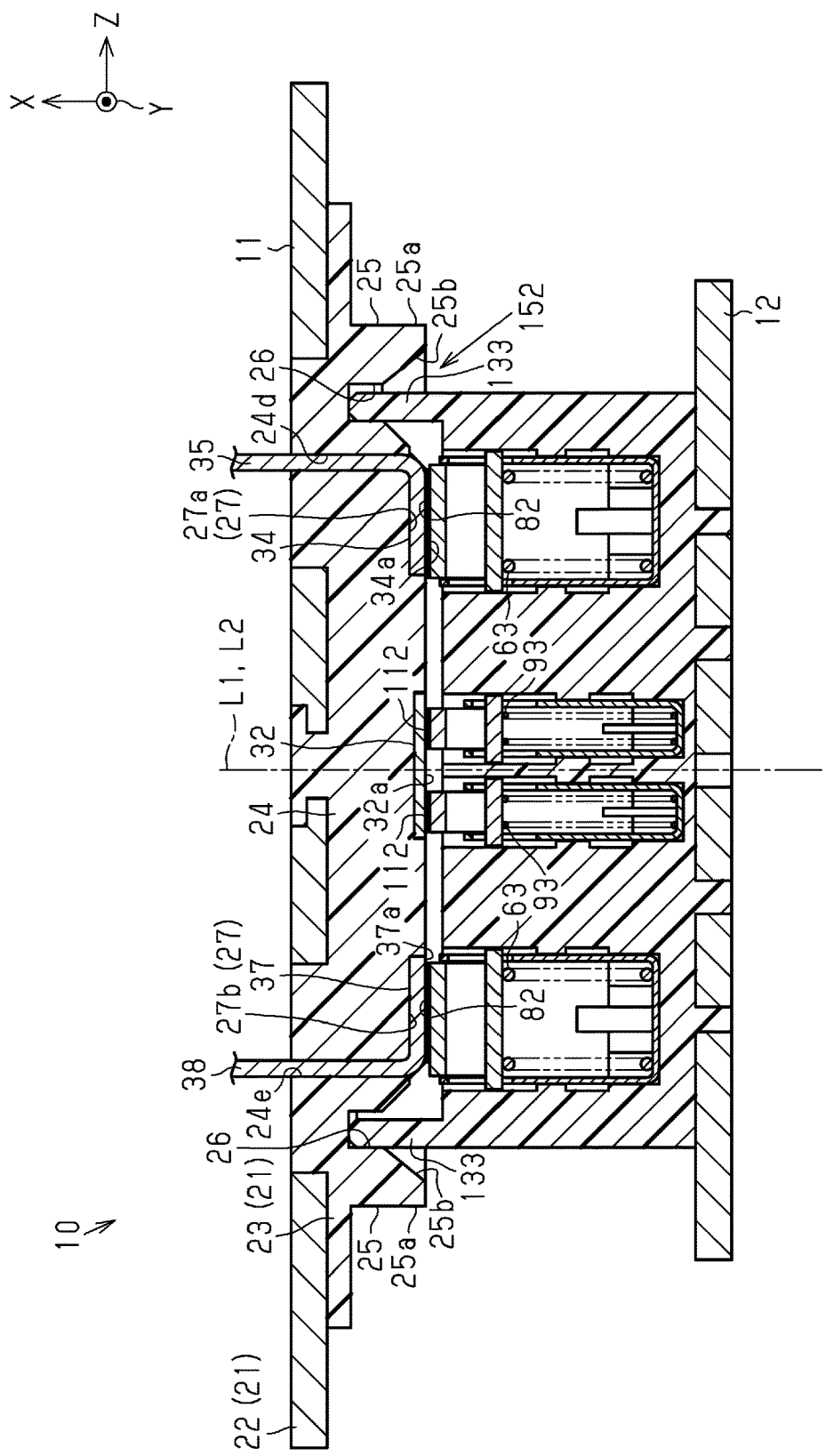
FIG. 10 is a cross-sectional view taken along line 10-10 in FIG. 7.

As shown in FIG. 10, the two first terminal modules 61 have the same structure. One of the first terminal modules 61 is electrically connected to the positive electrode high-voltage terminal 33 of the first connector portion 11, and the other of the first terminal modules 61 is electrically connected to the negative electrode high-voltage terminal 36 of the first connector portion 11. The two first terminal modules 61 respectively contact and electrically connect to the first plate-like portions 34 and 37. In the following description, the up-down direction X, the front-rear direction Y, and the left-right direction Z are used referring to a state in which the two first terminal modules 61 are respectively in contact with the circumferential central parts of the first plate-like portions 34 and 37. Further, a state in which the two first terminal modules 61 are respectively in contact with the circumferential central parts of the first plate-like portions 34 and 37 corresponds to a state in which the first connector portion 11 and the second connector portion 12 are connected to each other in a normal position. Hereafter, the term "normal position" will have the same meaning.

Figure 11:
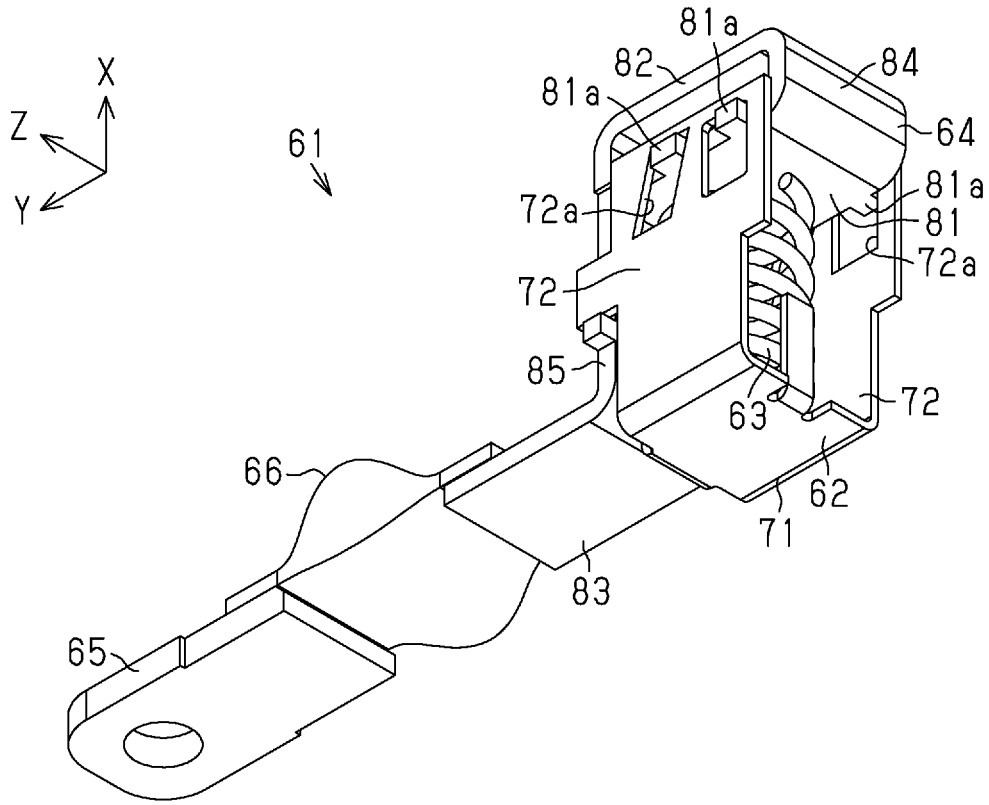
FIG. 11 is a perspective view of a first terminal module.
Figure 12:
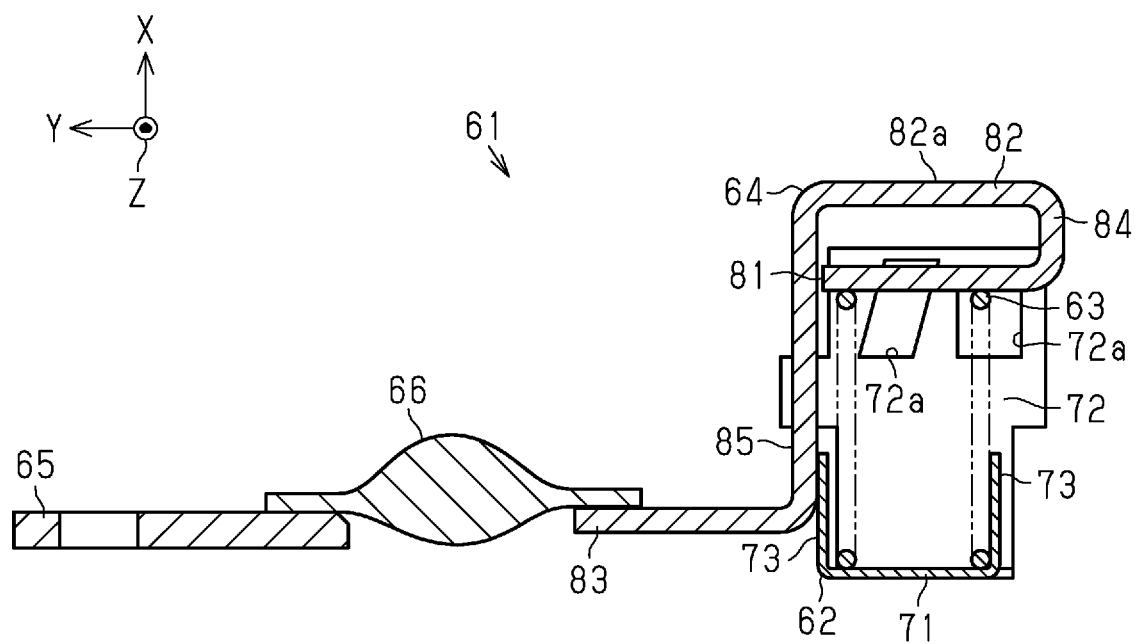
FIG. 12 is a cross-sectional view of the first terminal module.

As shown in FIGS. 11 and 12, each first terminal module 61 includes a support member 62, a coil spring 63, and a movable member 64. The support member 62 accommodates the coil spring 63. The elastic force of the coil spring 63 acts on the movable member 64. The first terminal module 61 includes a connecting member 65 and a flexible conductor 66. The connecting member 65 is electrically connected to a charging device. The flexible conductor 66 electrically connects the connecting member 65 and the movable member 64.

For example, the coil spring 63 is a compression coil spring. The coil spring 63 may be any one of various types of coil springs such as a cylindrical coil spring, a conical coil spring, or the like. The coil spring 63 may be a coil spring having a constant pitch or a variable pitch. The coil spring 63 of the present embodiment uses a cylindrical coil spring having a constant pitch.

The support member 62 includes a first wall 71, two second walls 72, and two restriction pieces 73. The first wall 71 contacts an end of the coil spring 63. The two second walls 72 extend from two opposing ends of the first wall 71. The two restriction pieces 73 extend from two opposing ends of the first wall 71 that differ from the two ends from which the second walls 72 extend.

The first wall 71 has the shape of a rectangular plate. The first wall 71 is configured to contact an end of the coil spring 63 in the up-down direction X.

The two second walls 72 extend from the first wall 71 parallel to each other. Each second wall 72 includes first and second guide portions 72a to receive portions of the movable member 64 and restrict the moving direction of the movable member 64. Each guide portion 72a is, for example, a through hole extending through the corresponding second wall 72 in the left-right direction Z. In each second wall 72, the first and second guide portions 72a are arranged next to each other in the front-rear direction Y. The first guide portion 72a is a rectangular opening that is longer in the vertical direction. The second guide portion 72a is a parallelogram-shaped opening. The first guide portion 72a of one of the second walls 72 is aligned with the first guide portion 72a of the other one of the second walls 72 in the left-right direction Z. The second guide portion 72a of one of the second walls 72 is aligned with the second guide portion 72a of the other one of the second walls 72 in the left-right direction Z. The support member 62 includes a total of four guide portions 72a. The guide portions 72a are formed in the second walls 72 facing one another in the left-right direction Z. Each second wall 72 includes two of the four guide portions 72a.

The two restriction pieces 73 respectively extend from substantially central positions of the two opposing ends of the first wall 71. The two restriction pieces 73 are relatively smaller than, for example, the two second walls 72 in width and length (length in extending direction). In other words, each restriction piece 73 forms a leaf spring that bends more easily than the second wall 72. Accordingly, for example, the restriction pieces 73 are bent to readily accommodate the coil spring 63 in the support member 62. The two restriction pieces 73 are bent so that their distal ends become farther from each other. This enlarges the portion from where the coil spring 63 is inserted so that the coil spring 63 is easily accommodated.

The movable member 64 includes a spring abutment portion 81, a contact portion 82, and a connecting portion 83. The spring abutment portion 81 contacts the coil spring 63. The contact portion 82 is exposed to the outside. The connecting portion 83 is connected to the flexible conductor 66.

The spring abutment portion 81 and the contact portion 82 are plate-shaped members extending in the same direction and have plate surfaces facing the up-down direction X. The spring abutment portion 81 and the contact portion 82 have the form of flat plates that are substantially parallel to each other. The spring abutment portion 81 and the contact portion 82 are spaced apart facing each other in the up-down direction X. The rear ends of the spring abutment portion 81 and the contact portion 82 at one side of the front-rear direction Y are connected by a first plate portion 84. The first plate portion 84 has the form of a flat plate extending in the up-down direction X.

The spring abutment portion 81 includes two sets of first and second projections 81a. One set of the first and second projections 81a projects leftward from the left end of the spring abutment portion 81. The other set of the first and second projections 81a projects rightward from the right end of the spring abutment portion 81. The two first projections 81a are aligned in the left-right direction Z. The two second projections 81a are aligned in the left-right direction Z. The two first projections 81a are each fitted to the corresponding one of the first guide portions 72a. The two second projections 81a are each fitted to the corresponding one of the second guide portions 72a. The spring abutment portion 81 of the present embodiment includes a total of four projections 81a, the number of which is the same as the guide portions 72a.

The contact portion 82 has a flat surface 82a at a side opposite to the surface facing the spring abutment portion 81. The flat surface 82a is configured to contact the first plate-like portion 34 of the first electrode 31. In a state in which the first connector portion 11 is attached to the second connector portion 12, the flat surface 82a contacts the first plate-like portion 34 of the first electrode 31 in the up-down direction X. In this state, the first electrode 31 of the first connector portion 11 is electrically connected to the first electrode 51 of the second connector portion 12. In the present example, the flat surface 82a of the contact portion 82 contacts the first plate-like portion 34. However, the contact portion 82 may further include, for example, a projection extending from the flat surface 82a in the up-down direction X. In this case, there may be one or more projections. In this manner, the contact portion 82 may be changed in shape and the like as long as the contact portion 82 is configured to contact the first electrode 31 for electric connection.

The connecting portion 83 has the form of a flat plate substantially parallel to the spring abutment portion 81 and the contact portion 82. The connecting portion 83 is located frontward from the spring abutment portion 81 and the contact portion 82 in the front-rear direction Y. The rear end of the connecting portion 83 is connected to the front end of the contact portion 82 by a second plate portion 85. In the same manner as the first plate portion 84, the second plate portion 85 has the form of a flat plate extending in the up-down direction X. The first plate portion 84 opposes the second plate portion 85 in the front-rear direction Y. The second plate portion 85 is longer than the first plate portion 84 in the up-down direction X. The second plate portion 85 extends in the up-down direction X from the front end of the contact portion 82 in the front-rear direction Y toward the spring abutment portion 81. In this case, the second plate portion 85 extends to a position beyond the spring abutment portion 81 for connection to the connecting portion 83.

The connecting member 65 is electrically connected to the charging device. The connecting member 65 may be formed by, for example, a plate-shaped conductive member.

The flexible conductor 66 is configured to connect the movable member 64 and the connecting member 65. Specifically, the flexible conductor 66 connects the connecting member 65 and the movable member 64 of which the relative positions change. For example, the flexible conductor 66 has flexibility. In an example, the flexible conductor 66 may be flexible by employing a braided wire in which conductive metal strands are braided. Therefore, even when the movable member 64 is moved relative to the connecting member 65 within a predetermined range, the flexible conductor 66 can follow the movement of the movable member 64 because of its flexibility.

The second electrode 52 includes two second terminal modules 91. The two second terminal modules 91 have the same structure and are electrically connected to the second electrode 32 of the first connector portion 11.

Figure 13:
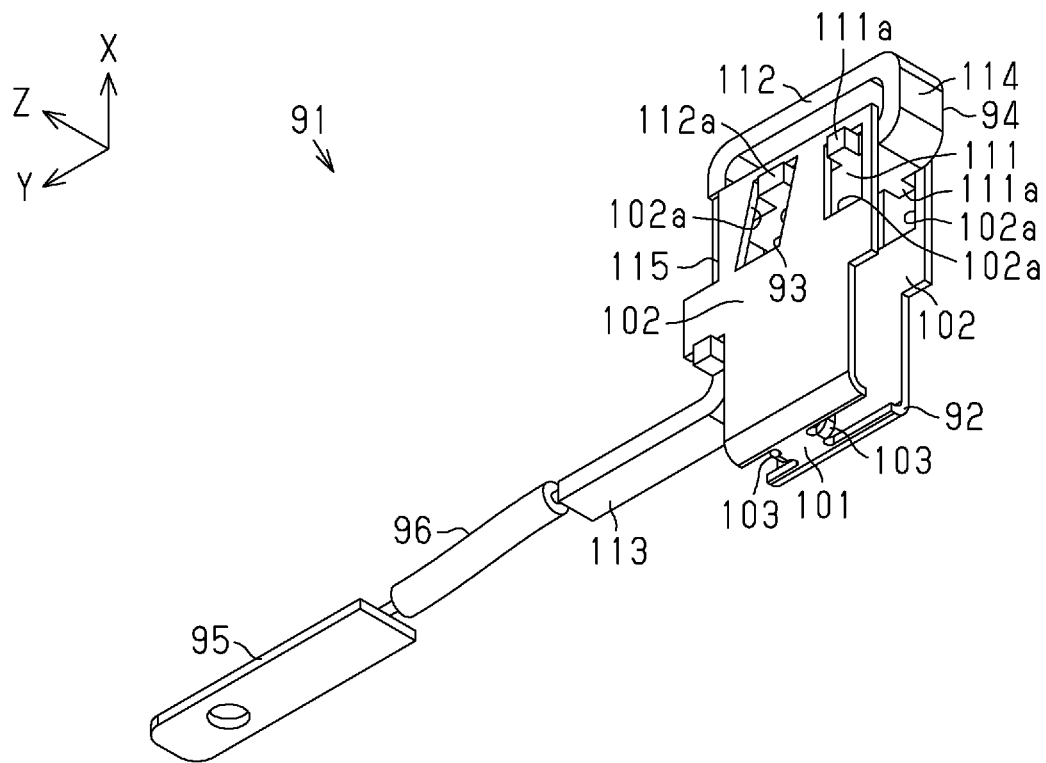
FIG. 13 is a perspective view of a second terminal module.
Figure 14:
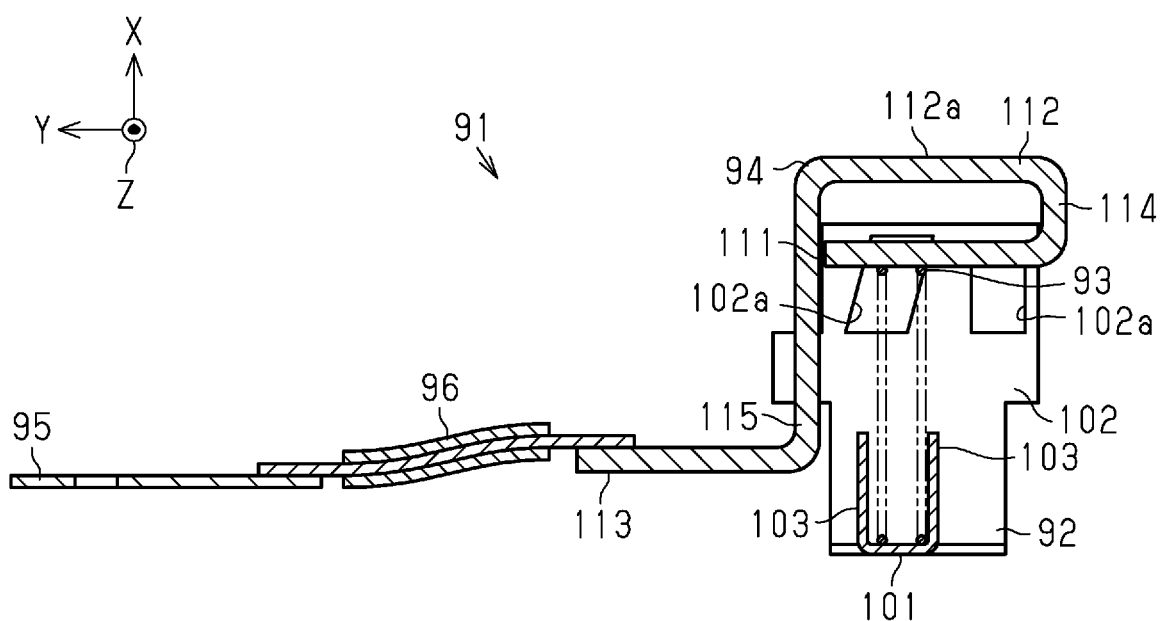
FIG. 14 is a cross-sectional view of the second terminal module.

As shown in FIGS. 13 and 14, each second terminal module 91 includes a support member 92, a coil spring 93, and a movable member 94. The support member 92 accommodates the coil spring 93. The elastic force of the coil spring 93 acts on the movable member 94. The second terminal module 91 includes a connecting member 95 and a flexible conductor 96. The connecting member 95 is electrically connected to the charging device. The flexible conductor 96 electrically connects the connecting member 95 and the movable member 94.

For example, the coil spring 93 is a compression coil spring. The coil spring 93 may be any one of various types of coil springs such as a cylindrical coil spring, a conical coil spring, or the like. The coil spring 93 may be a coil spring having a constant pitch or a variable pitch. The coil spring 93 of the present embodiment uses a cylindrical coil spring having a constant pitch.

The support member 92 includes a first wall 101, two second walls 102, and two restriction pieces 103. The first wall 101 contacts an end of the coil spring 93. The two second walls 102 extend from two opposing ends of the first wall 101. The two restriction pieces 103 extend from two opposing ends of the first wall 101 that differ from the two ends from which the second walls 102 extend.

The first wall 101 has the shape of a rectangular plate. The first wall 101 is configured to contact an end of the coil spring 93 in the up-down direction X.

The two second walls 102 extend from the first wall 101 parallel to each other. Each second wall 102 includes first and second guide portions 102a to receive portions of the movable member 94 and restrict the moving direction of the movable member 94. Each guide portion 102a is, for example, a through hole extending through the corresponding second wall 102 in the left-right direction Z. In each second wall 102, the first and second guide portions 102a are arranged next to each other in the front-rear direction Y. The first guide portion 102a is a rectangular opening that is longer in the vertical direction. The second guide portion 102a is a parallelogram-shaped opening. The first guide portion 102a of one of the second walls 102 is aligned with the first guide portion 102a of the other one of the second walls 102 in the left-right direction Z. The second guide portion 102a of one of the second walls 102 is aligned with the second guide portion 102a of the other one of the second walls 102 in the left-right direction Z. The support member 92 includes a total of four second guide portions 102a.

The two restriction pieces 103 respectively extend from substantially central positions of the two opposing ends of the first wall 101. The two restriction pieces 103 are relatively smaller than, for example, the two second walls 102 in width and length (length in extending direction). In other words, each restriction piece 103 forms a leaf spring that bends more easily than the second wall 102. Accordingly, for example, the restriction pieces 103 are bent to readily accommodate the coil spring 93 in the support member 92. The two restriction pieces 103 are bent so that their distal ends become farther from each other. This enlarges the portion from where the coil spring 93 is inserted so that the coil spring 93 is easily accommodated.

The movable member 94 includes a spring abutment portion 111, a contact portion 112, and a connecting portion 113. The spring abutment portion 111 contacts the coil spring 93. The contact portion 112 is exposed to the outside. The connecting portion 113 is connected to the flexible conductor 96.

The spring abutment portion 111 and the contact portion 112 are plate-shaped members extending in the same direction and have plate surfaces facing the up-down direction X. The spring abutment portion 111 and the contact portion 112 have the form of flat plates that are substantially parallel to each other. The spring abutment portion 111 and the contact portion 112 are spaced apart facing each other in the up-down direction X. The rear ends of the spring abutment portion 111 and the contact portion 112 at one side of the front-rear direction Y are connected by a first plate portion 114. The first plate portion 114 has the form of a flat plate extending in the up-down direction X.

The spring abutment portion 111 includes two sets of first and second projections 111a. One set of the first and second projections 111a projects leftward from the left end of the spring abutment portion 111. The other set of the first and second projections 111a projects rightward from the right end of the spring abutment portion 111. The two first projections 111a are aligned in the left-right direction Z. The two second projections 111a are aligned in the left-right direction Z. The two first projections 111a are each fitted to the corresponding one of the first guide portions 102a. The two second projections 111a are each fitted to the corresponding one of the second guide portions 102a. The spring abutment portion 111 of the present embodiment includes a total of four projections 111a, the number of which is the same as the guide portions 102a.

The contact portion 112 has a flat surface 112a at a side opposite to the surface facing the spring abutment portion 111. The flat surface 112a is configured to contact the flat surface 32a of the second electrode 32. In a state in which the first connector portion 11 is attached to the second connector portion 12, the flat surface 82a contacts the flat surface 32a of the second electrode 32 in the up-down direction. In this state, the second electrode 32 of the first connector portion 11 is electrically connected to the second electrode 52 of the second connector portion 12. In the present example, the flat surface 112a of the contact portion 112 contacts the flat surface 32a. However, the contact portion 112 may further include, for example, a projection extending from the flat surface 112a in the up-down direction X. In this case, there may be one or more projections. In this manner, the contact portion 112 may be changed in shape and the like as long as the contact portion 112 is configured to contact the second electrode 32 for electric connection.

The connecting portion 113 has the form of a flat plate substantially parallel to the spring abutment portion 111 and the contact portion 112. The connecting portion 113 is located frontward from the spring abutment portion 111 and the contact portion 112 in the front-rear direction Y. The rear end of the connecting portion 113 is connected to the front end of the contact portion 112 by a second plate portion 115. In the same manner as the first plate portion 114, the second plate portion 115 has the form of a flat plate extending in the up-down direction X. The first plate portion 114 opposes the second plate portion 115 in the front-rear direction Y. The second plate portion 115 is longer than the first plate portion 114 in the up-down direction X. The second plate portion 115 extends in the up-down direction X from the front end of the contact portion 112 in the front-rear direction Y toward the spring abutment portion 111. In this case, the second plate portion 115 extends to a position beyond the spring abutment portion 111 for connection to the connecting portion 113.

The connecting member 95 is electrically connected to the charging device. The connecting member 95 may be formed by, for example, a plate-shaped conductive member.

The flexible conductor 96 is configured to connect the movable member 94 and the connecting member 95. Specifically, the flexible conductor 96 connects the connecting member 95 and the movable member 94 of which the relative positions change. For example, the flexible conductor 96 has flexibility. In an example, the flexible conductor 96 may be flexible by employing a coated electric wire of which the core wire has a small diameter. Therefore, even when the movable member 94 is moved relative to the connecting member 95 within a predetermined range, the flexible conductor 96 can follow the movement of the movable member 94 because of its flexibility.

The voltage applied to the second electrode 52 is lower than that applied to the first electrode 51. This allows the flexible conductor 96 of the second electrode 52 to employ the coated electric wire of which the core wire has a small diameter, as described above. On the other hand, the voltage applied to the first electrode 51 is higher than that applied to the second electrode 52. Thus, the braided wire is used to receive high voltage while providing flexibility, as described above.

As shown in FIGS. 3 and 5, the housing 121 includes a base plate 122 and a holding portion 123. The holding portion 123 is attached to the base plate 122 to hold the first electrode 51 and the second electrode 52.

The base plate 122 is substantially disc-shaped.

The holding portion 123 includes a first holding portion 124 and a second holding portion 125. The second holding portion 125 extends from the first holding portion 124 in the front-rear direction Y. The holding portion 123 is formed by, for example, an insulative member of resin or the like.

The first holding portion 124 is formed to have, for example, a cylindrical shape. The first holding portion 124 is fixed to, for example, the base plate 122 by a fastener such as a bolt or the like. The first holding portion 124 includes an accommodation portion 131 and an accommodation portion 132. The accommodation portion 131 is configured to accommodate the two first terminal modules 61 independently from each other. The accommodation portion 132 is configured to accommodate the two second terminal modules 91 independently from each other.

In a state in which the support member 62 of each first terminal module 61 is accommodated in the accommodation portion 131, the accommodation portion 131 is engaged with the support member 62 of the first terminal module 61 in the up-down direction X. This restricts movement of the support member 62 from the accommodation portion 131 in the up-down direction X.

In a state in which the support member 92 of each second terminal module 91 is accommodated in the accommodation portion 132, the accommodation portion 132 is engaged with the support member 92 of the second terminal module 91 in the up-down direction X. This restricts movement of the support member 92 from the accommodation portion 132 in the up-down direction X.

The first terminal module 61 accommodated in the accommodation portion 131 is located at a position in the up-down direction X that differs from where the second terminal module 91 accommodated in the accommodation portion 132 is located.

Figure 6:
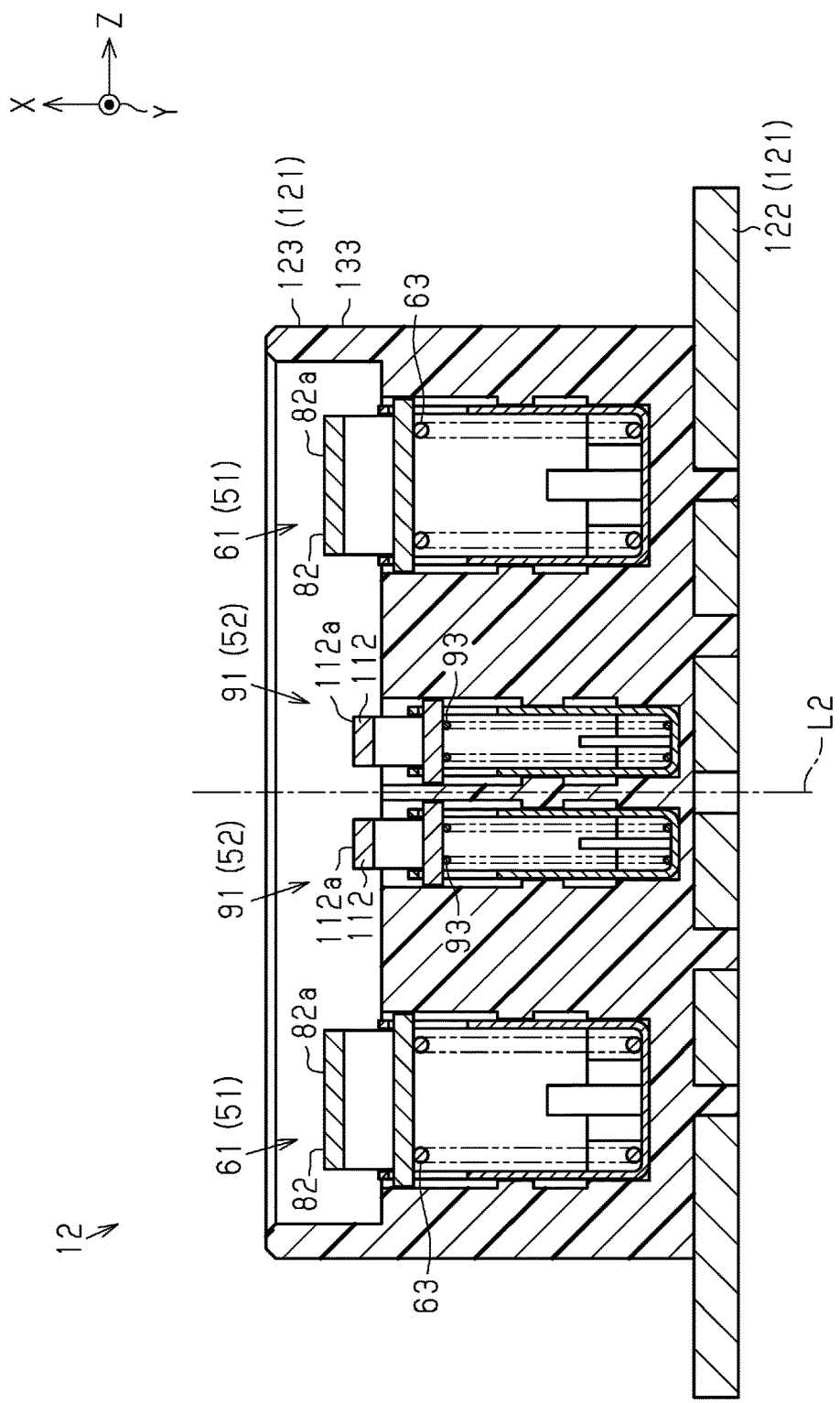
FIG. 6 is a cross-sectional view taken along line 6-6 in FIG. 5.

The accommodation portion 131 and the accommodation portion 132 are arranged next to each other in the left-right direction Z. More specifically, as shown in FIG. 6, in a state in which the first connector portion 11 is separated from the second connector portion 12, the first terminal modules 61 and the second terminal modules 91 are respectively accommodated in the accommodation portions 131 and 132 such that the first terminal modules 61 project further upward from the second terminal modules 91 in the up-down direction X. Accordingly, the contact portion 82 of each first terminal module 61 of the first electrode 51 is located further upward from the contact portion 112 of each second terminal module 91 of the second electrode 52 in the up-down direction X. Thus, when attaching the first connector portion 11 to the second connector portion 12, the first electrode 51 of the second connector portion 12 comes into contact with the first electrode 31 of the first connector portion 11 before the second electrode 52 of the second connector portion 12 comes into contact with the second electrode 32 of the first connector portion 11. That is, the first electrode 51 of the second connector portion 12 is always in contact with the first electrode 31 of the first connector portion 11 when the second electrode 52 of the second connector portion 12 contacts the second electrode 32 of the first connector portion 11. Such a structure allows the electric connection between the second electrodes 32 and 52 to be detected, which in turn, indicating that the first connector portion 11 is attached to the second connector portion 12 and power can be supplied (charged). When removing the second connector portion 12 from the first connector portion 11, the first electrode 51 of the second connector portion 12 separates from the first electrode 31 of the first connector portion 11 before the second electrode 52 of the second connector portion 12 separates from the second electrode 32 of the first connector portion 11. That is, the first electrode 51 of the second connector portion 12 is always separated from the first electrode 31 of the first connector portion 11 when the second electrode 52 of the second connector portion 12 separates from the second electrode 32 of the first connector portion 11. Such a structure allows the electric disconnection between the second electrodes 32 and 52 to be detected, which in turn, indicates that the second connector portion 12 has been removed from the first connector portion 11 and the supply of power (charging) has ended.

As shown in FIGS. 3 and 5, the first holding portion 124 includes a cylindrical projection 133. The cylindrical projection 133 is arranged at an outer side of the accommodation portions 131 and 132 and projects further outward in the up-down direction X from the accommodation portions 131 and 132. The cylindrical projection 133 is configured to be arranged at the outer side of the accommodation portions 131 and 132 and project further outward in the up-down direction X from the accommodation portions 131 and 132. The cylindrical projection 133 is formed to have, for example, a cylindrical shape extending in the up-down direction X and configured to be fitted to the annular groove 26 of the first connector portion 11.

As shown in FIG. 3, the second holding portion 125 is configured to extend from the first holding portion 124 toward the front side in the front-rear direction Y. The second holding portion 125 accommodates the flexible conductors 66 and 96 and the connecting members 65 and 95.

The second connector portion 12 of the present embodiment further includes a pin engagement groove 140 that receives the pin 42 of the actuator 41. The pin engagement groove 140 is formed in an attachment piece 141 attached to the base plate 122. The attachment piece 141 is formed in an arcuate manner in correspondence with the cylindrical projection 133 of the first holding portion 124. The attachment piece 141 is disposed next to the cylindrical projection 133 in the front-rear direction Y. More specifically, the attachment piece 141 is located rearward from the cylindrical projection 133. When the first connector portion 11 is attached to the second connector portion 12 in a normal position, the attachment piece 141 opposes the actuator 41 in the front-rear direction Y. Even when the first connector portion 11 is attached to the second connector portion 12 at a position that differs from the normal position within a predetermined range, the distance from the attachment piece 141 to the actuator 41 remains constant.

The pin engagement groove 140 is recessed radially inward over a specified range of the attachment piece 141 in the circumferential direction. Accordingly, even when the first connector portion 11 is attached to the second connector portion 12 at a position differing from the normal position within a predetermined range in the circumferential direction, the pin 42 of the actuator 41 can be fitted to the pin engagement groove 140 within the range of the pin engagement groove 140. When the pin 42 of the actuator 41 is fitted in the pin engagement groove 140, the pin 42 is engaged with the pin engagement groove 140 in the up-down direction X. This avoids separation of the second connector portion 12 from the first connector portion 11 in the up-down direction X due to its weight or the like. In the present embodiment, the actuator 41 and the pin engagement groove 140 form a first lock portion 151.

However, when the pin 42 is fitted in the pin engagement groove 140 contacting the pin engagement groove 140 at only one position in the up-down direction X, such a state cannot be maintained stably.

In this regard, the cylindrical projection 133 of the second connector portion 12 is configured to be fitted to the annular groove 26 of the first connector portion 11 in the present embodiment. Thus, the annular groove 26 abuts the cylindrical projection 133 when the second connector portion 12 acts to move from where the pin 42 contacts the pin engagement groove 140 in the up-down direction X, or the gravitational direction. In this manner, the pin 42 and the pin engagement groove 140 are stably held in the engaged state. In the present embodiment, the annular groove 26 and the cylindrical projection 133 form a second lock portion 152.

The operation of the present embodiment will now be described.

The connector device 10 of the present embodiment is configured to allow attachment and detachment of the first connector portion 11 to and from the second connector portion 12. When the first electrode 31 of the first connector portion 11 is connected to the first electrode 51 of the second connector portion 12, power can be supplied from the second connector portion 12 to the first connector portion 11.

Further, in the connector device 10 of the present embodiment, the pin engagement groove 140 of the first lock portion 151, which forms a lock, receives the pin 42 of the actuator 41 from the radially outer side. This results in engagement of the pin engagement groove 140 and the pin 42 in the up-down direction X.

The present embodiment has the following advantages.

(1) The first lock portion 151 has the first connector portion 11 and the second connector portion 12 engaged together in the attachment-detachment direction. This restricts separation of the first connector portion 11 and the second connector portion 12.

(2) The first lock portion 151 restricts relative movement of the first connector portion 11 and the second connector portion 12 in the attachment-detachment direction, and the engagement state resulting from the first lock portion 151 is held by the second lock portion 152. This restricts separation of the first connector portion 11 and the second connector portion 12. Further, when separating the two connector portions, the pin 42 of the first lock portion 151 is moved to disengage the pin 42 from the pin engagement groove 140. This allows for easy separation of the connector portions.

(3) The second lock portion 152 has a simple structure including the annular groove 26, which is a recess, recessed in a direction intersecting the engagement direction of the pin engagement groove 140 and the pin 42, and the cylindrical projection 133, which is a projection fitted to the annular groove 26.

(4) The annular groove 26 and the cylindrical projection 133 are ring-shaped. This stably holds the first lock portion 151 in the engaged state.

The above embodiment may be changed as described below. The above embodiment and the following modifications can be combined as long as the combined modifications remain technically consistent with each other.

In the above embodiment, in a state in which the first connector portion 11 is separated from the second connector portion 12, the contact portion 82 of the first terminal module 61 of the first electrode 51 is located upward from the contact portion 112 of the second terminal module 91 of the second electrode 52 in the up-down direction X. However, there is no limitation to such a structure. The contact portion 82 of the first terminal module 61 may be located at the same position as the contact portion 112 of the second terminal module 91 in the up-down direction X. Furthermore, instead of the second connector portion 12, the first connector portion 11 may have such a structure. In this case, the first electrode 31 and the second electrode 32 may be located at different positions in the up-down direction X in the first connector portion 11.

In the present embodiment, the electrodes 51 and 52 use the coil springs 63 and 93 so as to be movable (back and forth) in the up-down direction X, respectively. However, there is no limitation to such a structure. The electrodes 51 and 52 may use an elastic member, such as rubber member or the like, rather than a coil spring to be movable.

The electrodes 51 and 52 may each be immovable. Further, only the first electrode 51 of the second connector portion 12 may be movable and the second electrode 52 of the second connector portion 12 may be immovable. In this case, the structure that allows for movement of the movable members 64 and 94 in a predetermined direction, such as the movable members 64 and 94 and the guide portions 72a and 102a, may be omitted from the terminal modules 61 and 91. Also, the flexible conductors 66 and 96 that connect the movable members 64 and 94 to the connecting members 65 and 95 may be omitted.

In the present embodiment, the first connector portion 11 includes the second electrode 32, and the second connector portion 12 includes the second electrode 52. However, the second electrodes 32 and 52 may be omitted.

In the present embodiment, only the first connector portion 11 includes the first electrode 31 serving as an elongated electrode extending in the circumferential direction. However, there is no limitation to such a structure. For example, only the second connector portion 12 may include an elongated electrode extending in the circumferential direction. Alternatively, the first connector portion 11 and the second connector portion 12 may both include the elongated electrode.

In the present embodiment, the first plate-like portions 34 and 37 of the first electrode 31 of the first connector portion 11 each have an annular sector shape. However, there is no limitation to such a structure. The first plate-like portions 34 and 37 only need to extend in the circumferential direction and may have the shape of, for example, a simple sector.

In the present embodiment, the pin 42 is moved back and forth by the electrically driven actuator 41. However, there is no limitation to such a configuration. For example, the pin 42 may be manually moved back and forth by a compression coil spring or the like.

In the above embodiment, the first lock portion 151 and the second lock portion 152 form a lock. However, there is no limitation to such a structure.

Figure 15:
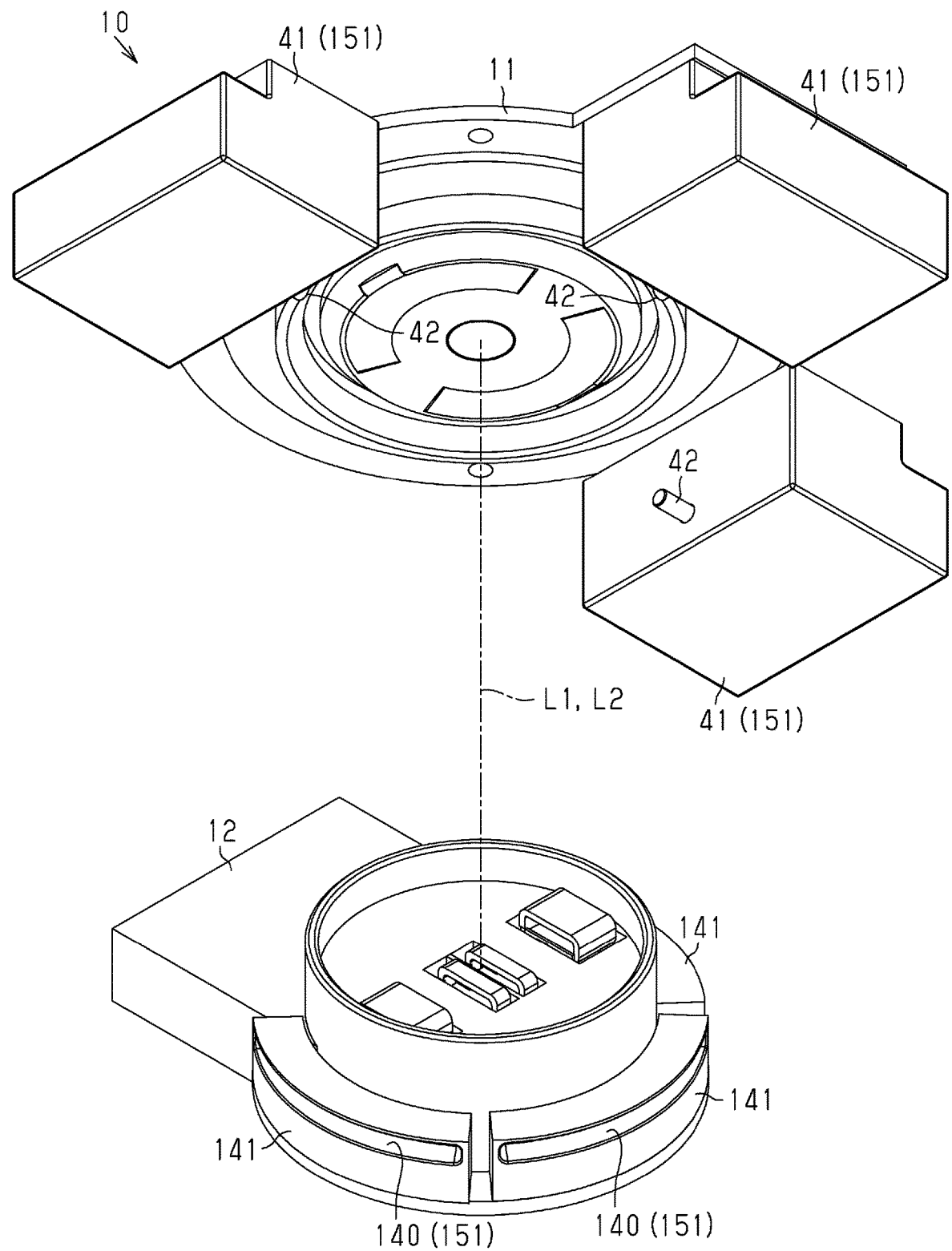
FIG. 15 is an exploded perspective view of a connector device according to a modified example.

As shown in FIG. 15, a plurality of first lock portions 151 may be employed. FIG. 15 shows an example where three sets of the actuator 41 and the pin engagement groove 140, each forming the first lock portion 151, are arranged in the circumferential direction. The plurality of first lock portions 151 arranged in the circumferential direction allows the first connector portion 11 and the second connector portion 12 to be stably held in a connected state with only the first lock portions 151.

In the present embodiment, the actuator 41 is configured to linearly move the pin 42. However, there is no limitation to such a configuration. The pin may be pivoted or rotated by an actuator. In other words, the pin may be moved in any actuation (movement) direction as long as the pin is moved back and forth by an actuator relative to one of the first connector portion 11 and the second connector portion 12 and at least partially inserted into and engaged with the other one of the first connector portion 11 and the second connector portion 12.

In the present embodiment, the connector device 10 is described as a device that electrically connects a vehicle (battery) to a charging device. However, the connector device 10 may be used for other purposes. For example, the connector device may be used to electrically connect a robot to a charging device. Furthermore, the connector device does not have to be used for charging a battery and may connect a motor and an inverter. In this case, it is preferred that the first electrode have three terminals separated from one another by 120 degrees to supply three-phase alternating current.

The present disclosure includes following embodiments. Reference numerals of the components of the exemplary embodiments are given to facilitate understanding and not to limit the scope of the invention. Some of the components described in the following examples may be omitted or combined In several embodiments of the present disclosure, a connector device (10) includes:

a first connector portion (11);

a second connector portion (12) configured to be attached to and detached from the first connector portion (11) when moved in an attachment-detachment direction; and one or more lock portions (151) configured to restrict movement of the second connector portion (12) in the attachment-detachment direction in a state in which the second connector portion (12) is attached to the first connector portion (11)

In several examples, the second connector portion (12) may include a ring-shaped circumferential wall (cylindrical projection 133), and the first connector portion (11) may include an annular groove (26) configured to accommodate the circumferential wall (cylindrical projection 133).

In several examples, the second connector portion (12) may include a pin engagement groove (140), and the lock portions (151) may each include a pin (pin 42) configured to be engaged with the pin engagement groove 140 (140).

In several examples, the second connector portion (12) may include a pin engagement groove (140) extending along the circumferential wall (133) or the annular groove (26), and the lock portions (151) may each include a pin (pin 42) configured to be engaged with the pin engagement groove (140).

In several examples, the connector device (10) may include the lock portions (151) arranged in a circumferential direction of the circumferential wall (133) or the annular groove (26).

In several examples, the lock portions (151) may have the same structure.

In several examples, at least one of the first connector portion (11) and the second connector portion (12) may include one or more elongated electrodes (31) extending in a circumferential direction of the circumferential wall (133) or the annular groove (26).

In several examples, each of the elongated electrodes (31) may include a positive electrode terminal (33) and a negative electrode terminal (36), and the positive electrode terminal (33) and the negative electrode terminal (36) may be arranged next to each other in the circumferential direction.

In several examples, the first connector portion (11) may include the positive electrode terminal (33) and the negative electrode terminal (36), and the second connector portion (12) may include two terminal modules (61) configured to be electrically connected to the positive electrode terminal (33) and the negative electrode terminal (36), respectively.

In several examples, the terminal modules (61) may each include a connecting surface (flat surface 82*a*) electrically connectable to a corresponding one of the elongated electrodes (31), and each of the elongated electrodes (31) may be longer than the connecting surface (82*a*) in a circumferential direction.

DESCRIPTION OF THE REFERENCE CHARACTERS

L1: first center axis
L2: second center axis
X: up-down direction
Y: front-rear direction
Z: left-right direction
10: connector device
11: first connector portion
12: second connector portion
21: housing
22: base plate
23: holding portion
24: holding portion main body
24*a*: end surface
24*b*: corner
24*c*: chamfer
24*d*: through hole
24*e*: through hole
25: guide
25*a*: radially outward side surface
25*b*: radially inner side surface
26: annular groove
27: first seat
27*a*: first seat
27*b*: first seat
28: second seat
31: first electrode (elongated electrode)
32: second electrode (center electrode)
32*a*: flat surface
33: positive electrode high-voltage terminal (positive electrode terminal)
34: first plate-like portion
34*a*: flat surface
35: second plate-like portion
36: negative electrode high-voltage terminal (negative electrode terminal)
37: first plate-like portion
37*a*: flat surface
38: second plate-like portion
41: actuator
42: pin
51: first electrode (first mating electrode, mating electrode)
52: second electrode (second mating electrode, mating electrode)
61: first terminal module
62: support member
63: coil spring
64: movable member
65: connecting member
66: flexible conductor
71: first wall
72: second wall
72*a*: guide portion
73: restriction piece
81: spring abutment portion
81*a*: projection
82: contact portion
82*a*: flat surface
83: connecting portion
84: first plate portion
85: second plate portion
91: second terminal module
92: support member
93: coil spring
94: movable member
95: connecting member
96: flexible conductor
101: first wall
102: second wall
102*a*: guide portion
103: restriction piece
111: spring abutment portion
111*a*: projection
112: contact portion
112*a*: flat surface
113: connecting portion
114: first plate portion
115: second plate portion
121: housing
122: base plate
123: holding portion
124: first holding portion
125: second holding portion
131 accommodation portion
132: accommodation portion
133: cylindrical projection
140: pin engagement groove
141: attachment piece
151: first lock portion of lock
152: second lock portion of lock

The invention claimed is:

1. A connector device comprising:

a first connector portion;

a second connector portion configured to engage with the first connector portion in an attachment-detachment direction;

a first lock portion including:

an actuator that is arranged on one of the first connector portion and the second connector portion and configured to move a pin back and forth, and a pin engagement groove that is arranged in the other one of the first connector portion and the second connector portion and is configured to receive and engage the pin in the attachment-detachment direction; and a second lock portion that holds the pin engagement groove and the pin of the first lock portion in the engaged state, wherein the second lock portion includes:

a recess that is arranged in one of the first connector portion and the second connector portion and recessed in a direction intersecting an engagement direction of the pin engagement groove and the pin, and a projection that is arranged on the other one of the first connector portion and the second connector portion and fitted to the recess, wherein the pin engagement groove has a shape recessed radially inward over a specified range in the circumferential direction of the other one of the first connector portion and the second connector portion, wherein the pin can be fitted into the pin engagement groove even when the first connector portion and the second connector portion are at a position differing from a normal position within a predetermined range in the circumferential direction, wherein the pin engagement groove faces the actuator in a direction perpendicular to the attachment-detachment direction at the normal position, and wherein the recess and the projection extend in the attachment-detachment direction of the first connector portion and the second connector portion, and are ring-shaped in a circumferential direction extending about an imaginary axis that lies on an attachment-detachment center.

* * * * *